United States Patent
Pang et al.

(10) Patent No.: US 12,429,398 B2
(45) Date of Patent: Sep. 30, 2025

(54) AUTOMATIC PATROL INSPECTION AND INTELLIGENT EROSION DEFECT DETECTION METHOD AND APPARATUS FOR FLOOD DISCHARGE TUNNEL

(71) Applicants: Huaneng Lancang River Hydropower Inc., Yunnan (CN); Tianjin University, Tianjin (CN)

(72) Inventors: Bohui Pang, Yunnan (CN); Haibin Xiao, Yunnan (CN); Xuexing Cao, Yunnan (CN); Hao Chen, Yunnan (CN); Mai Meng, Yunnan (CN); Haodong Chen, Yunnan (CN)

(73) Assignees: Huaneng Lancang River Hydropower Inc., Kunming (CN); Tianjin University, Tianjin (CN)

( * ) Notice: Subject to any disclaimer, the term of this patent is extended or adjusted under 35 U.S.C. 154(b) by 281 days.

(21) Appl. No.: 18/329,570

(22) Filed: Jun. 5, 2023

(65) Prior Publication Data
US 2024/0183743 A1    Jun. 6, 2024

Related U.S. Application Data

(63) Continuation of application No. PCT/CN2023/082049, filed on Mar. 17, 2023.

(30) Foreign Application Priority Data

Aug. 26, 2022   (CN) .......................... 202211034688.6

(51) Int. Cl.
*G01M 5/00*     (2006.01)
*B64U 50/19*    (2023.01)
(Continued)

(52) U.S. Cl.
CPC .......... *G01M 5/0033* (2013.01); *B64U 50/19* (2023.01); *G01M 5/0075* (2013.01);
(Continued)

(58) Field of Classification Search
CPC ............ G01M 5/0033; G01M 5/0075; G01M 5/0091; B64U 50/19; B64U 2101/26;
(Continued)

(56) References Cited

FOREIGN PATENT DOCUMENTS

CN           106828959 A  *   6/2017

* cited by examiner

*Primary Examiner* — Georgia Y Epps
*Assistant Examiner* — Monica T Taba

(57) ABSTRACT

The present disclosure relates to an automatic patrol inspection and intelligent erosion defect detection method and apparatus for a flood discharge tunnel, and belongs to the technical field of patrol inspection and defect detection. The method includes: constructing a flood discharge tunnel erosion defect database; constructing a flood discharge tunnel erosion defect analysis and evaluation standard and early warning threshold; performing automatic patrol inspection; and performing image analysis processing and intelligent recognition model training. According to the present disclosure, a condition of the flood discharge tunnel can undergo automatic patrol inspection, an erosion impact degree can be rapidly recognized and determined, the downstream life safety are not in danger during flood discharge, and a patrol inspection efficiency and a detection efficiency can be noticeably improved.

15 Claims, 5 Drawing Sheets

(51) Int. Cl.
  *B64U 101/26* (2023.01)
  *G06T 7/00* (2017.01)
  *G06V 10/774* (2022.01)
  *G06V 10/776* (2022.01)
  *G06V 10/82* (2022.01)

(52) U.S. Cl.
  CPC ......... *G01M 5/0091* (2013.01); *G06T 7/0004* (2013.01); *G06V 10/774* (2022.01); *G06V 10/776* (2022.01); *G06V 10/82* (2022.01); *B64U 2101/26* (2023.01); *G06T 2207/20081* (2013.01); *G06T 2207/20084* (2013.01); *G06T 2207/30108* (2013.01); *G06T 2207/30184* (2013.01)

(58) Field of Classification Search
  CPC ......... G06T 7/0004; G06T 2207/20081; G06T 2207/20084; G06T 2207/30108; G06T 2207/30184; G06V 10/774; G06V 10/776; G06V 10/82; Y02A 10/40; G01N 21/95; G01N 21/8851; B64C 39/024; B64D 47/08
  See application file for complete search history.

AUTOMATIC PATROL INSPECTION AND INTELLIGENT EROSION DEFECT DETECTION METHOD AND APPARATUS FOR FLOOD DISCHARGE TUNNEL

TECHNICAL FIELD

The present disclosure belongs to the technical field of patrol inspection and defect detection, and relates to an automatic patrol inspection and intelligent erosion defect detection method and apparatus for a flood discharge tunnel.

BACKGROUND TECHNOLOGY

The water discharge and energy dissipation structures are damaged with a dramatically high probability during operation. According to incomplete statistics, nearly ⅓ of the existing water discharge and energy dissipation structures have been damaged to varying degrees. Under a crucial impact of a variety of complicated factors affecting its safety, there is a distinct possibility that the water discharge and energy dissipation structures are damaged. It can be seen from the investigation results that the water discharge and energy dissipation structures are damaged mostly due to the over-standard inflow conditions, insufficient design level, unsatisfactory construction quality, unrational operation and scheduling, diseases or damages in the long-term service process, etc. Upon the combined action of various factors that are not noticed and fixed with effective repair measures in time, the damage to projects is caused constantly. Consequently, the safety of the water discharge and energy dissipation structures and even adjacent dam bodies and slopes will be affected. Moreover, the downstream life safety will also be affected, leading to significant social and economic losses and a deeply negative impact on safety.

In the prior art, the patrol inspection method mostly relies on the senses of eyes, ears, hands, noses, etc. intuitively, with the aid of tools such as a hammer, a drill rod, a measure gage, a magnifying glass, a telescope, a camera, and a video camera. Such an intuitive inspection method features the high requirements on inspection personnel, high labor intensity, low work efficiency, and failure to perform omnibearing and fine patrol inspection on a top arch, an upper end of a side wall, etc. with bad illumination or a high depth of water. In addition, a report is written manually after patrol inspection, which is unconducive to rapid recognition and early warning. Therefore, the problem of how to overcome the shortcomings in the prior art is to be solved immediately in the technical field of patrol inspection and defect detection currently.

Summary of the Utility Model

An objective of the present disclosure is to overcome the shortcomings in the prior art, and provides an automatic patrol inspection and intelligent erosion defect detection method and apparatus for a flood discharge tunnel. According to the present disclosure, a condition of the flood discharge tunnel may undergo automatic patrol inspection, and a type, position, shape, and depth of an erosion defect may be recognized in an omnibearing, rapid, and high-precision manner. An erosion impact degree may be intelligently analyzed and determined, so as to give out early warning and an alarm prompt when the erosion defect exceeds a threshold. Moreover, early warning and a processing prompt may be made automatically and rapidly, avoiding leaving the downstream life safety in danger during flood discharge. The present disclosure features a higher intelligent degree, a stronger accident prevention capacity, a greatly-improved patrol inspection efficiency and detection efficiency, and a noticeably-reduced labor cost while a safety accident caused when personnel enters the flood discharge tunnel to carry out high-risk patrol inspection and measurement operations is avoided.

In order to realize the above objective, the present disclosure employs the technical solutions as follows:

an automatic patrol inspection and intelligent erosion defect detection apparatus for a flood discharge tunnel includes a patrol inspection device body, a top end of the patrol inspection device body being provided with a protective housing, and an adjustment mechanism being arranged inside the protective housing; where the adjustment mechanism includes a connection supporting shaft block arranged inside the protective housing, one side of the connection supporting shaft block being connected to a transmission shaft rod, the other end of the transmission shaft rod being provided with a servo driving electric motor for driving, two symmetrically-arranged connection shaft ring rods sleeving an outside of the transmission shaft rod, a portion, close to the other end, of the connection shaft ring rod being internally provided with a fixing rod in a penetrated manner, one side of the middle of the fixing rod being connected to a connection sleeve ring block, one side of the connection sleeve ring block being connected to a transmission platform, a first driving electric motor being mounted on the transmission platform, an output end of the first driving electric motor being connected to a driving rod, a top end of the driving rod being provided with a holographic three-dimensional scanner, and a second driving electric motor being arranged inside the holographic three-dimensional scanner.

Further, preferably, an output end of the second driving electric motor is connected to a rotary rod, a connection shaft block sleeving an outside of the rotary rod, and one side of the connection shaft block being fixedly connected to a measurement camera.

Further, preferably, linkage switching mechanisms sleeve outsides of one ends of the rotary rods, the linkage switching mechanism including a driving sleeve ring rod arranged outside one end of the rotary rod, an adjustment rotary rod being movably connected into a portion, close to a top end, of the driving sleeve ring rod, a switching electric motor being mounted at one end of the adjustment rotary rod, an output end of the switching electric motor being fixedly connected to the adjustment rotary rod, an adjustment shaft ring block being arranged outside the adjustment rotary rod and positioned on one side of the top end of the driving sleeve ring rod, a first irradiation lamp being mounted on one side of the adjustment shaft ring block, and a second irradiation lamp being mounted on the other side of the adjustment shaft ring block.

Further, preferably, a limiting screw block is mounted on one side of the driving sleeve ring rod.

Further, preferably, four supporting frames are symmetrically arranged outside the patrol inspection device body, a portion, close to an end portion, of the supporting frame being provided with a lifting electric motor, an output end of the lifting electric motor being connected to a driving blade, and a level sensor being mounted on one side of the driving blade; and a wireless transmitter is arranged inside the patrol inspection device body, and a cambered support is arranged below the two adjacent supporting frames, a buffer base being arranged below the cambered support, and a bottom end of the buffer base being connected to a bulged support.

Further, preferably, an output end of the wireless transmitter is connected to a wireless receiver, a processing device being mounted at a bottom end of the wireless receiver, an acousto-optic alarm being mounted on one side of the wireless receiver, a display screen being embedded in one side of the processing device, an image memory being arranged below the display screen, and an image processor being arranged on one side of the image memory.

Further, preferably, a first battery is arranged below the patrol inspection device body, two leveling guide plates being symmetrically arranged below the first battery, one opposite sides of the two leveling guide plates being provided with guide grooves, a crossed guide block being slidably arranged inside the guide groove, one end of the crossed guide block being connected to a pushing supporting rod, an electric cylinder being mounted at one end of the pushing supporting rod, a second battery being arranged between the two crossed guide blocks, a bottom end of the second battery being connected to a supporting plate, and one end of the second battery being provided with a connection port.

The present disclosure further provides an automatic patrol inspection and intelligent erosion defect detection method for a flood discharge tunnel. The method employs the above automatic patrol inspection and intelligent erosion defect detection apparatus for a flood discharge tunnel and includes:

step 1, constructing a flood discharge tunnel erosion defect database by acquiring global flood discharge tunnel operation condition data including a type, position, scale, and impact of erosion generated during operation of massive global flood discharge tunnels; and then dividing flood discharge tunnel erosion defect data in the flood discharge tunnel erosion defect database into three grades, where a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;

step 2, constructing a flood discharge tunnel erosion defect analysis and evaluation standard and early warning threshold: constructing a defect type evaluation standard according to impact degrees, on the safety of flood discharge, of scouring, abrasion, and cavitation types: classifying no erosion on a surface of the tunnel as grade 1, an erosion depth less than 3 mm as grade 2, and an erosion depth greater than or equal to 3 mm as grade 3; where the early warning threshold is the erosion depth greater than or equal to 3 mm;

step 3, performing automatic patrol inspection through the automatic patrol inspection and intelligent erosion defect detection apparatus for a flood discharge tunnel: performing patrol inspection on an entire tunnel through laser scanning along a patrol inspection route set before take-off, performing a lighting operation, and uploading an acquired image wirelessly; and step 4, performing image analysis processing and intelligent recognition model training: constructing an image database, processing each to-be-trained image in two ways, where in one aspect, the image is stored as an original image, and in the other aspect, the image is labeled with a corresponding true tag, and putting pictures having the same type of tag into a picture set of the same type simultaneously; constructing an image recognition neural network, inputting a to-be-trained original image into the neural network for image recognition processing to obtain an output tag type; comparing the output tag type with a true tag of the picture, and performing loss calculation on a result; adjusting a parameter of the neural network through the loss calculation, and updating a neural network model; re-performing image recognition on the picture to finally obtain a perfect image recognition neural network; and finally recognizing an erosion defect through the image recognition neural network, and performing corresponding evaluation and early warning on the basis of the evaluation standard and early warning threshold constructed in step 2.

Further, preferably, in step 4, when the image is recognized, recognition information includes a type, position, shape, and depth of erosion.

In the present disclosure, the first battery may be connected to the second battery in series through a wire harness. The batteries are connected in a normal manner, merely to implement a balance operation by increasing a weight. Moreover, the first battery and the second battery provide power for an entire apparatus and may be connected to an electric structural component in an existing manner, which will not be excessively limited by the present disclosure.

Compared with the prior art, the present disclosure has the beneficial effects as follows:

1. According to the present disclosure, the condition of the flood discharge tunnel may undergo the automatic patrol inspection, and the type, position, shape, and depth of the erosion defect may be recognized in the omnibearing, rapid, and high-precision manner. The erosion impact degree may be intelligently analyzed and determined, so as to give out the early warning and the alarm prompt when the erosion defect exceeds the threshold. Moreover, the early warning and the processing prompt may be made automatically and rapidly, avoiding leaving the downstream life safety in danger during flood discharge. The present disclosure features a higher intelligent degree, a stronger accident prevention capacity, the greatly-improved patrol inspection efficiency and detection efficiency, and the noticeably-reduced labor cost while the safety accident caused when the personnel enters the flood discharge tunnel to carry out the high-risk patrol inspection and measurement operations is avoided.

2. According to the present disclosure, an image recognition efficiency of a computer is gradually improved through training on the basis of the constructed image recognition neural network, and the loss calculation is performed on the image processing result. Therefore, the neural network may be perfected, a neural network structure may be optimized and updated, the image recognition accuracy may be further improved, and evaluation such as defect type recognition and defect impact degree analysis and determination may be technically ensured.

3. According to the present disclosure, the rotary rod drives the connection shaft block to rotate through the adjustment mechanism, the connection shaft block drives the measurement camera to rotate, and the measurement camera starts to perform left-right reciprocation and up-down angular reciprocation driving, so as to perform lateral irradiation. The transmission platform drives the holographic three-dimensional scanner to turn the measurement camera upwards by 90 degrees clockwise, and the measurement camera starts to face a top surface of the flood discharge tunnel, so as to perform full-angle scanning. In this way, lateral blind corner scanning may be effectively improved, so as to scan a blind corner at a top end of the flood discharge tunnel. Therefore, a scanning efficiency and comprehensiveness are improved, a scanning effect is optimized, and no blind corner is generated.

4. According to the present disclosure, the rotary rod drives the driving sleeve ring rod to rotate through the linkage switching mechanism, and the adjustment rotary rod drives the adjustment shaft ring block to deflect angularly downwards. In this way, a light irradiation operation may be performed along with the measurement camera, thereby ensuring the light irradiation accuracy, and providing a sufficient light effect for a scanning process. Moreover, switch from the first damaged irradiation lamp to the second irradiation lamp may be performed, so as to form a standby light switch operation. Therefore, the light may be used normally, the return of an unmanned aerial vehicle caused by a light problem may be avoided, and a patrol inspection efficiency may be effectively improved.

5. According to the present disclosure, when the measurement camera turns upwards by 90 degrees clockwise, the level sensor detects an angle in a horizontal direction. The electric cylinder drives the pushing supporting rod to move leftwards, and the second battery drives the supporting plate to move leftwards. In this way, when the center of gravity is shifted backwards in an angle switch process of the measurement camera, the second battery may move leftwards to ensure the balance of the center of gravity. Therefore, the horizontal stability of the unmanned aerial vehicle in use may be improved, the stability may be better, and the normal operation of the unmanned aerial vehicle may be ensured.

In conclusion, under the mutual impact of the plurality of above actions, scanning is performed automatically, rapidly, and stably, the erosion depth is analyzed intelligently and precisely, the early warning is made automatically in time. Accordingly, a tunnel body and the downstream life safety are not damaged or in danger during flood discharge, the risk prevention capacity is stronger, and the intelligent level is higher. The scanning efficiency and comprehensiveness may be improved, the scanning effect may be optimized, and no blind corner may be generated. The standby light switch operation is realized, so that the light is used normally, and the return of the unmanned aerial vehicle caused by the light problem is avoided, thereby effectively improving the patrol inspection efficiency, and improving the horizontal stability of the unmanned aerial vehicle in the normal use process. Moreover, an intelligent algorithm is employed, so that the position, shape, and depth of the erosion may be recognized efficiently, rapidly, precisely, and automatically, and compared and analyzed against thresholds automatically, so as to give out intelligent early warning and alarming. In view of that, the patrol inspection efficiency may be effectively improved, the intelligent erosion defect analysis efficiency and precision may be improved, the safety of patrol inspection may be improved, the safety problem of the flood discharge tunnel may be prompted in time for processing, and the safety of flood discharge may be ensured.

DESCRIPTION OF ATTACHED DRAWINGS

In order to describe the technical solutions in the examples of the present disclosure or in the prior art more clearly, the accompanying drawings required for describing the examples or the prior art are briefly described below. Obviously, the accompanying drawings in the following description show merely some examples of the present disclosure, and those of ordinary skill in the art can also derive other accompanying drawings from these accompanying drawings without creative efforts.

Figure 1:
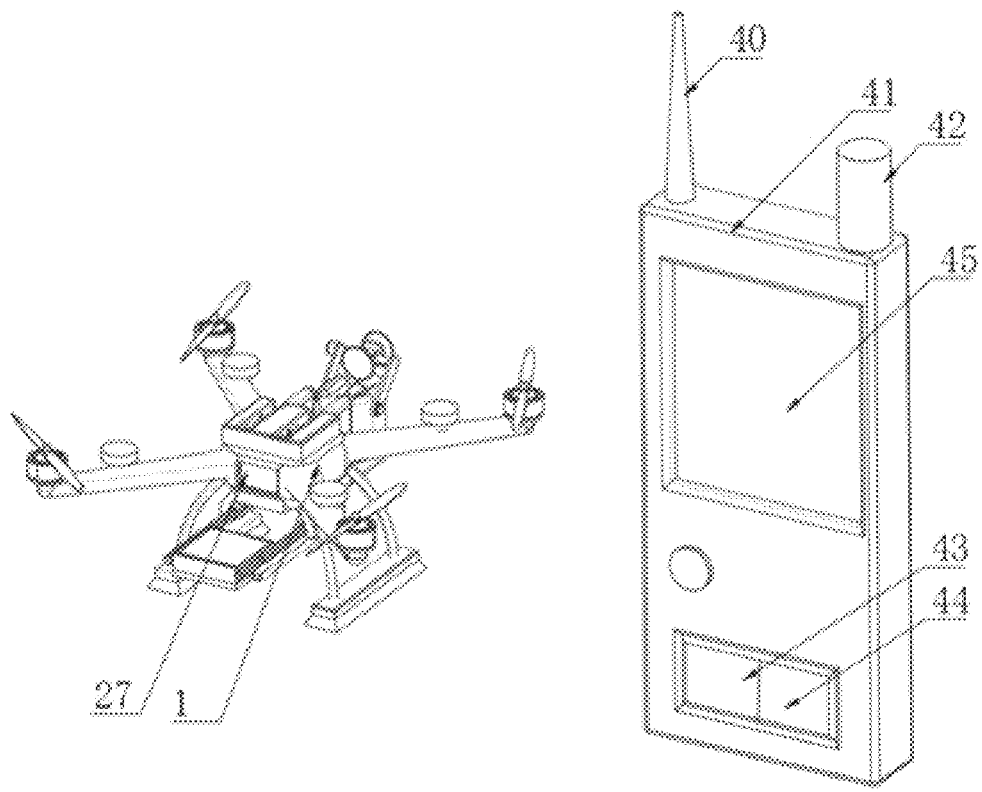
FIG. 1 is a schematic diagram of a wireless transmission principle of an unmanned aerial vehicle according to the present disclosure.

In the figures, 1. patrol inspection device body; 2. protective housing; 3. connection supporting shaft block; 4. transmission shaft rod; 5. servo driving electric motor; 6. connection shaft ring rod; 7. fixing rod; 8. connection sleeve ring block; 9. transmission platform; 10. first driving electric motor; 11. driving rod; 12. holographic three-dimensional scanner; 13. second driving electric motor; 14. rotary rod; 15. connection shaft block; 16. measurement camera; 17. driving sleeve ring rod; 18. adjustment rotary rod; 19. switching electric motor; 20. adjustment shaft ring block; 21. first irradiation lamp; 22. second irradiation lamp; 23. limiting screw block; 24. supporting frame; 25. lifting electric motor; 26. driving blade; 27. wireless transmitter; 28. first battery; 29. cambered support; 30. buffer base; 31. bulged support; 32. leveling guide plate; 33. guide groove; 34. crossed guide block; 35. pushing supporting rod; 36. electric cylinder; 37. second battery; 38. supporting plate; 39. connection port; 40. wireless receiver; 41. processing device; 42. acousto-optic alarm; 43. image memory; 44. image processor; 45. display screen; and 46. level sensor.

Specific Embodiments

The present disclosure will be further described in detail below with reference to the examples.

Those skilled in the art will understand that the following examples are merely illustrative of the present disclosure and should not be deemed as limiting the scope of the present disclosure. If specific technologies or conditions are not indicated in the examples, procedures are performed according to technologies or conditions described in the documents in the art or the product description. Materials or apparatuses used without the manufacturer indicated are conventional products that are commercially available.

Those skilled in the art can understand that unless otherwise stated, the singular forms such as "a", "an", "the", and "this" used herein can also include the plural forms. It should be further understood that the words "comprise" and "include" used in the description of the present disclosure specify the presence of the described features, integers, steps, operations, elements, and/or assemblies, but do not exclude the presence or addition of one or more other features, integers, steps, operations, elements, assemblies, and/or their groups. It should be understood that when referred to as being "connected" to another element, an element can be directly connected to another element or through an intermediate element. In addition, "connection" used herein can include wireless connection. The word "and/or" used herein includes one or any and all combinations of more associated items listed.

In the description of the present disclosure, unless otherwise specified, "a plurality" means two or more. The orientation or state relations indicated by the terms "inner", "upper", "lower", etc. are based on those shown in the accompanying drawings and merely for the ease of describing the present disclosure and simplifying the description, rather than indicating or implying that the device or element referred to must be in a specific orientation or constructed and operated in a specific orientation, and therefore cannot be interpreted as limiting the present disclosure.

In the description of the present disclosure, it is to be noted that unless otherwise clearly specified and limited, the terms "mounted", "connection", and "provided with" should be understood in a broad sense. For example, the connection can be fixed connection, detachable connection, integral connection, mechanical connection, electrical connection, direct connection, or indirect connection through an intermediate medium. For those of ordinary skill in the art, the specific meanings of the above terms in the present disclosure can be understood according to specific circumstances.

Those skilled in the art can understand that unless otherwise defined, all the terms (including technical terms and scientific terms) used herein have ordinary meanings understood by those of ordinary skill in the art to which the present disclosure belongs. It should be further understood that terms, such as those defined in commonly used dictionaries, should be interpreted as having the same meanings as in the context in the prior art and will not be interpreted in an idealized or overly formal sense unless so defined herein.

An automatic patrol inspection and intelligent erosion defect detection apparatus for a flood discharge tunnel includes a patrol inspection device body 1, a top end of the patrol inspection device body 1 being provided with a protective housing 2, and an adjustment mechanism being arranged in the protective housing 2; where the adjustment mechanism includes a connection supporting shaft block 3 arranged inside the protective housing 2, one side of the connection supporting shaft block 3 being connected to a transmission shaft rod 4, the other end of the transmission shaft rod 4 being provided with a servo driving electric motor 5 for driving, two symmetrically-arranged connection shaft ring rods 6 sleeving an outside of the transmission shaft rod 4, a portion, close to the other end, of the connection shaft ring rod 6 being internally provided with a fixing rod 7 in a penetrated manner, one side of the middle of the fixing rod 7 being connected to a connection sleeve ring block 8, one side of the connection sleeve ring block 8 being connected to a transmission platform 9, a first driving electric motor 10 being mounted on the transmission platform 9, an output end of the first driving electric motor 10 being connected to a driving rod 11, a top end of the driving rod 11 being provided with a holographic three-dimensional scanner 12, and a second driving electric motor 13 being arranged inside the holographic three-dimensional scanner 12.

Figure 5:
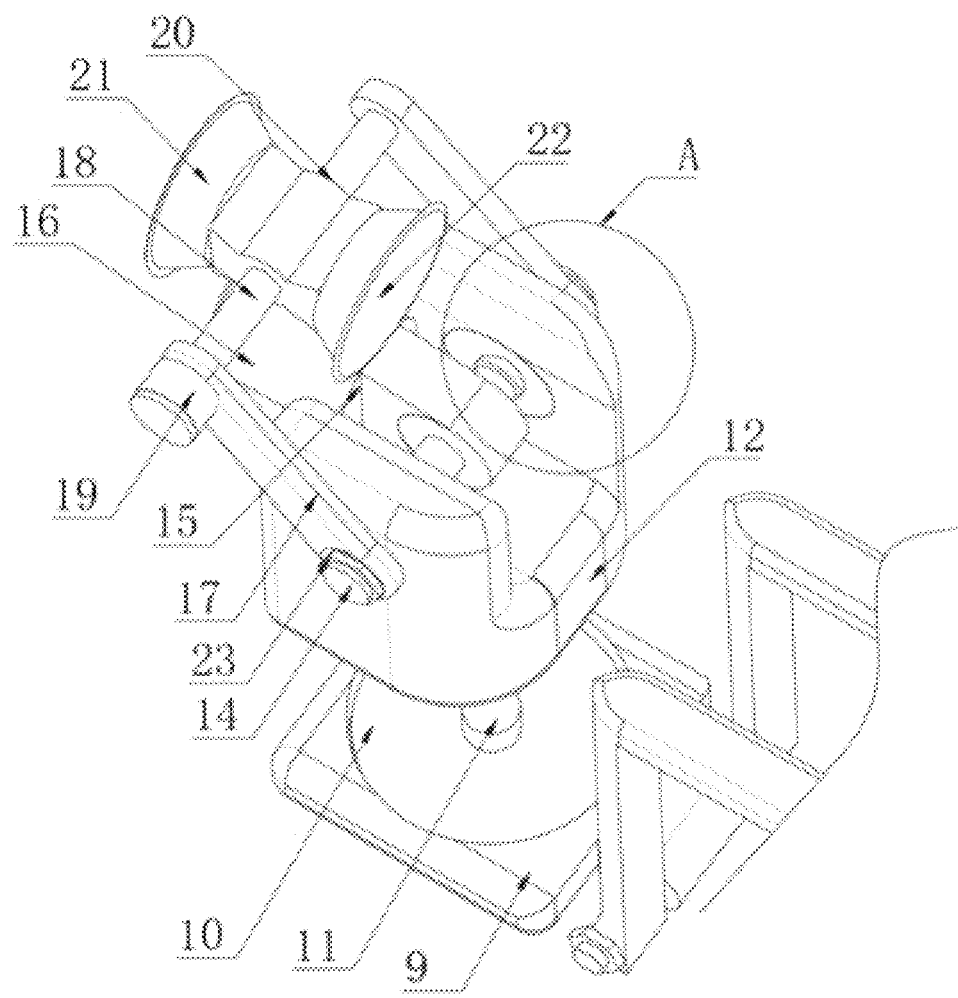
FIG. 5 is an exploded schematic structural diagram of a driving rod and a holographic three-dimensional scanner according to the present disclosure.
Figure 8:
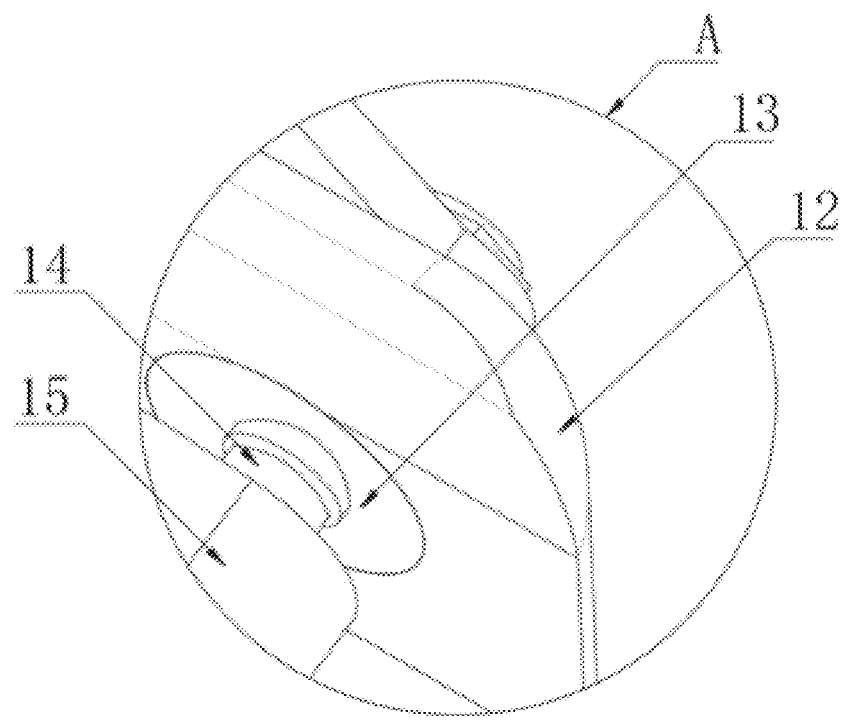
FIG. 8 is an enlarged schematic structural diagram of portion A in FIG. 5 according to the present disclosure.

As shown in FIGS. 5 and 8, an output end of the second driving electric motor 13 is connected to a rotary rod 14, a connection shaft block 15 sleeving an outside of the rotary rod 14, and one side of the connection shaft block 15 being connected to a measurement camera 16. The connection shaft block 15 is fixedly connected to the measurement camera 16. Therefore, the second driving electric motor 13 drives the rotary rod 14 to rotate counterclockwise, and the rotary rod 14 drives the connection shaft block 15 to rotate, so that an angle in a vertical direction of the measurement camera 16 is adjusted.

Figure 4:
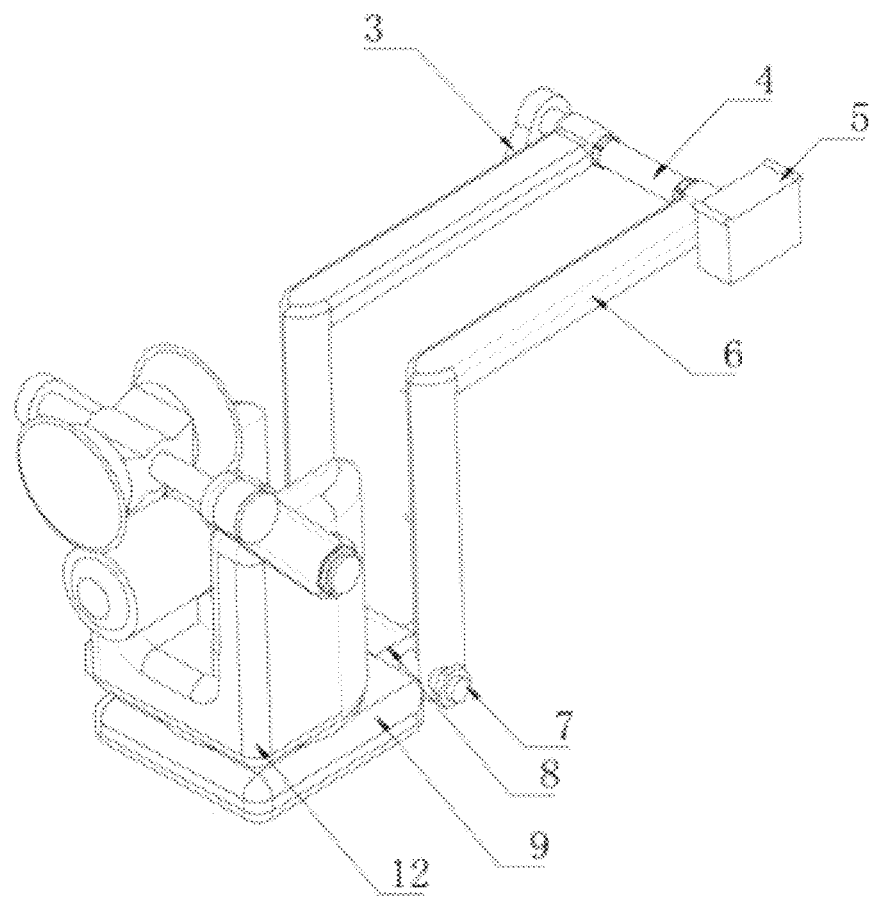
FIG. 4 is a schematic structural diagram of a joint between a transmission shaft rod and a servo driving electric motor according to the present disclosure.

As shown in FIGS. 4 and 5, an upper end and a lower end of the driving rod 11 are fixedly connected to the first driving electric motor 10 and the holographic three-dimensional scanner 12, respectively, and the transmission shaft rod 4 is fixedly connected to the servo driving electric motor 5. Therefore, the first driving electric motor 10 may drive the driving rod 11 to drive the holographic three-dimensional scanner 12 to perform transverse angular deflection, and the servo driving electric motor 5 may drive the transmission shaft rod 4 to perform driving.

As shown in FIG. 5, linkage switching mechanisms sleeve outsides of one ends of the rotary rods 14, the linkage switching mechanism including a driving sleeve ring rod 17 arranged outside one end of the rotary rod 14, an adjustment rotary rod 18 being movably connected into a portion, close to a top end, of the driving sleeve ring rod 17, a switching electric motor 19 being mounted at one end of the adjustment rotary rod 18, an output end of the switching electric motor 19 being fixedly connected to the adjustment rotary rod 18, an adjustment shaft ring block 20 being arranged outside the adjustment rotary rod 18 and positioned on one side of the top end of the driving sleeve ring rod 17, a first irradiation lamp 21 being mounted on one side of the adjustment shaft ring block 20, and a second irradiation lamp 22 being mounted on the other side of the adjustment shaft ring block 20. Therefore, the rotary rod 14 drives the driving sleeve ring rod 17 to rotate, and the adjustment shaft ring block 20 deflects angularly downwards. After the first irradiation lamp 21 is damaged, the switching electric motor 19 may be activated to rotate, so as to perform switch from the first irradiation lamp 21 to the second irradiation lamp 22, thereby activating a standby light for irradiation. As shown in FIG. 5, two sides of the adjustment shaft ring block 20 are detachably connected to the second irradiation lamp 22 and the first irradiation lamp 21 through bolts, respectively. The driving sleeve ring rod 17 is fixedly connected to the adjustment rotary rod 18 and the rotary rod 14, a limiting screw block 23 being mounted on one side of the driving sleeve ring rod 17. Therefore, the limiting screw block 23 limits the driving sleeve ring rod 17.

Figure 2:
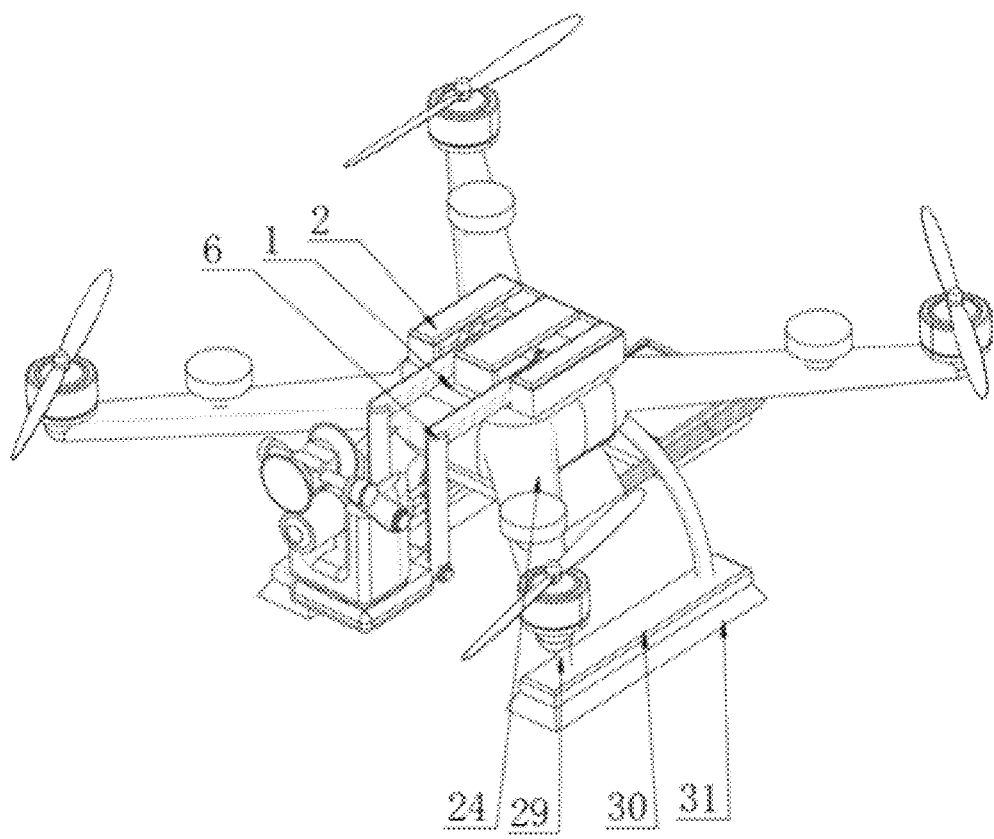
FIG. 2 is a schematic structural diagram of an entire patrol inspection device body according to the present disclosure.
Figure 3:
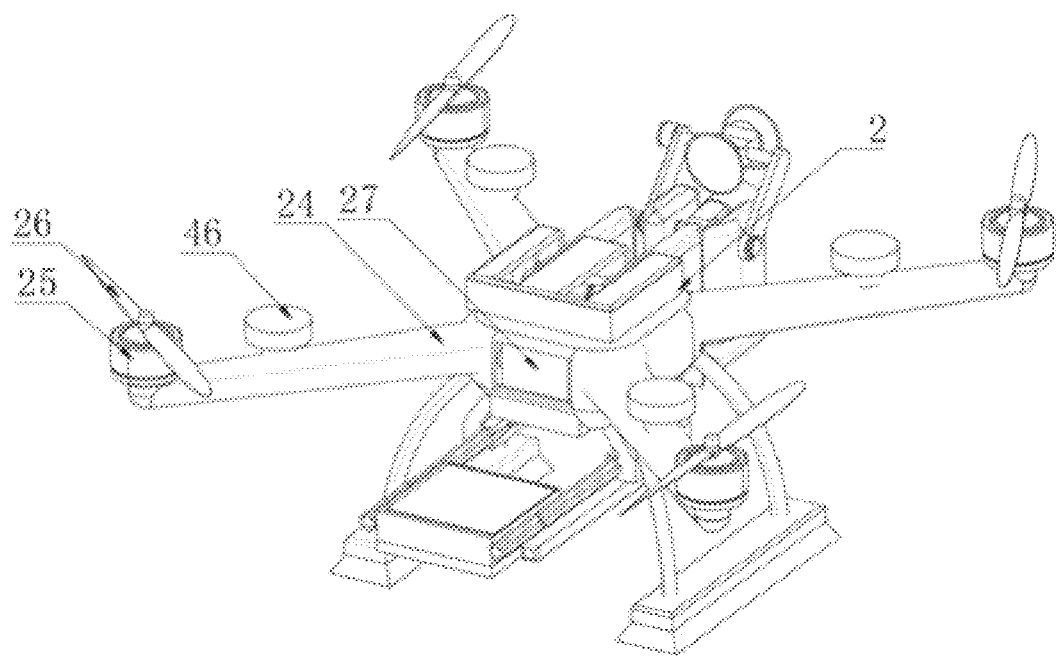
FIG. 3 is a schematic structural diagram of a wireless transmitter according to the present disclosure.

As shown in FIGS. 2 and 3, four supporting frames 24 are symmetrically arranged outside the patrol inspection device body 1, a portion, close to an end portion, of the supporting frame 24 being provided with a lifting electric motor 25, an output end of the lifting electric motor 25 being connected to a driving blade 26, and a level sensor 46 being mounted on one side of the driving blade 26; and a wireless transmitter 27 is arranged inside the patrol inspection device body 1, and a cambered support 29 is arranged below two adjacent supporting frames 24, a buffer base 30 being arranged below the cambered support 29, and a bottom end of the buffer base 30 being connected to a bulged support 31. Therefore, an incline angle of the supporting frame 24 is detected through the level sensor 46. The lifting electric motor 25 drives the driving blade 26 to rotate, thereby generating a lift force for flying. When the unmanned aerial vehicle lands, the bulged support 31 buffers the buffer base 30, and accordingly, the buffer base 30 buffers the two cambered supports 29.

Figure 6:
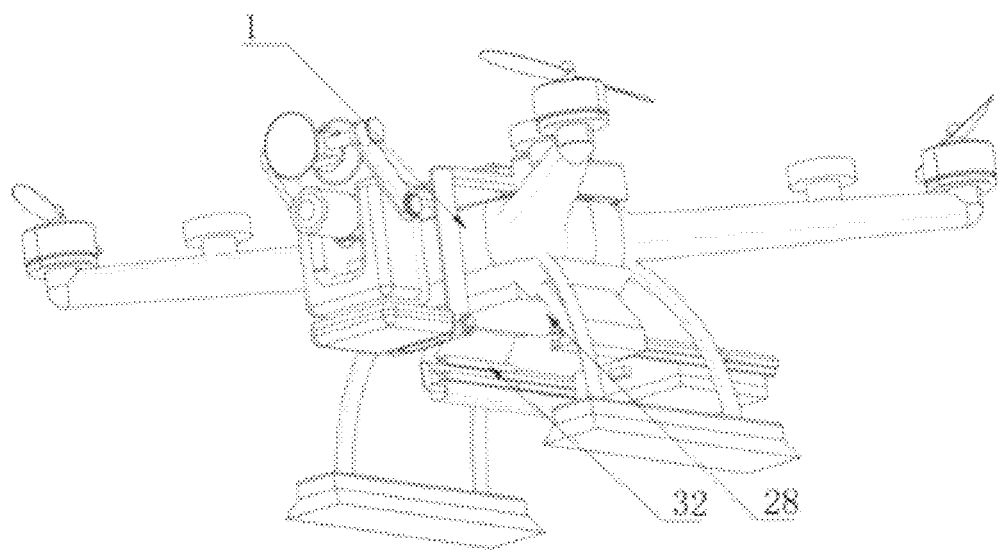
FIG. 6 is a schematic structural diagram of a lower portion of a patrol inspection device body according to the present disclosure.
Figure 7:
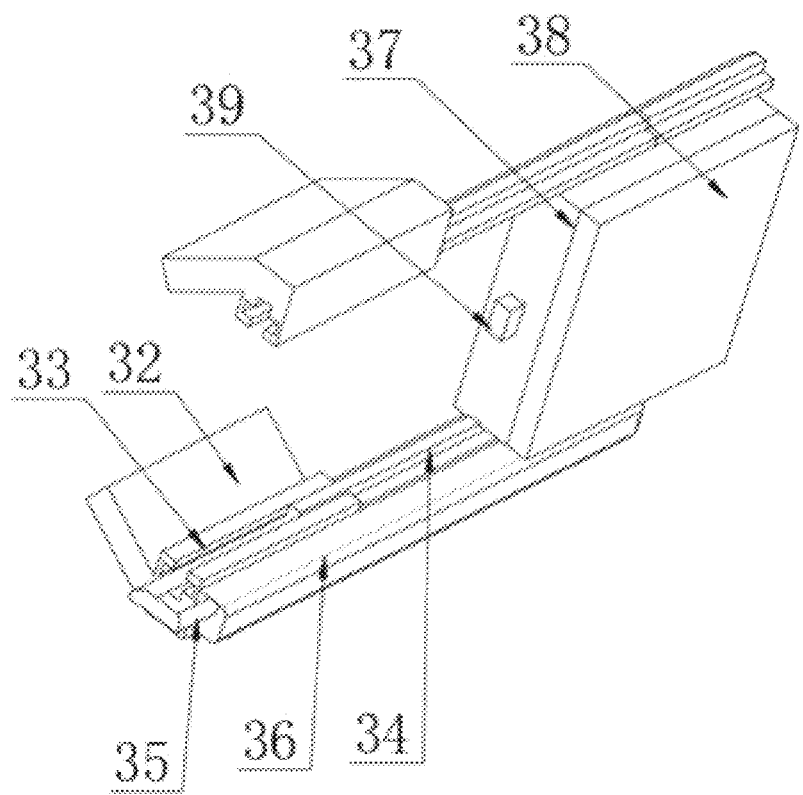
FIG. 7 is a schematic structural diagram of a joint between a crossed guide block and a second battery according to the present disclosure.

As shown in FIGS. 6 and 7, a first battery 28 is arranged below the patrol inspection device body 1, two leveling guide plates 32 being symmetrically arranged below the first battery 28, one opposite sides of the two leveling guide plates 32 being provided with guide grooves 33, a crossed guide block 34 being slidably arranged inside the guide groove 33, one end of the crossed guide block 34 being connected to a pushing supporting rod 35, an electric cylinder 36 being mounted at one end of the pushing supporting rod 35, a second battery 37 being arranged between the two crossed guide blocks 34, a bottom end of the second battery 37 being connected to a supporting plate 38, and one end of the second battery 37 being provided with a connection port 39. Therefore, a leveling operation may be implemented to ensure a horizontal state of an entire unmanned aerial vehicle when the measurement camera 16 is turned.

As shown in FIG. 1, an output end of the wireless transmitter 27 is connected to a wireless receiver 40, a processing device 41 being mounted at a bottom end of the wireless receiver 40, an acousto-optic alarm 42 being mounted on one side of the wireless receiver 40, a display screen 45 being embedded in one side of the processing device 41, an image memory 43 being arranged below the display screen 45, and an image processor 44 being arranged on one side of the image memory 43. Therefore, the wireless receiver 40 receives an image and transmits same into the image memory 43 for image comparison and recognition, thereby performing an alarming operation according to an early warning grade.

An automatic patrol inspection and intelligent erosion defect detection method for a flood discharge tunnel. The method employs the automatic patrol inspection and intelligent erosion defect detection apparatus for a flood discharge tunnel according to any one of claims 1-7 and includes:

step 1, a flood discharge tunnel erosion defect database is constructed by acquiring global flood discharge tunnel operation condition data including a type, position, scale, and impact of erosion generated during operation of massive global flood discharge tunnels; and then flood discharge tunnel erosion defect data in the flood discharge tunnel erosion defect database are divided into three grades, where a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;

step 2, a flood discharge tunnel erosion defect analysis and evaluation standard and early warning threshold index system is constructed: a defect type evaluation standard is constructed according to impact degrees, on the safety of flood discharge, of scouring, abrasion, and cavitation types: no erosion on a surface of the tunnel is classified as grade 1; an erosion depth less than 3 mm is classified as grade 2; and erosion depth greater than or equal to 3 mm is classified as grade 3; where an early warning threshold is the erosion depth greater than or equal to 3 mm;

step 3, automatic patrol inspection is performed through the automatic patrol inspection and intelligent erosion defect detection apparatus for a flood discharge tunnel or an unmanned aerial vehicle: patrol inspection is precisely performed on an entire tunnel without a blind corner through laser scanning along a patrol inspection route set before take-off, a lighting operation is performed, and an acquired image is uploaded wirelessly; and step 4, image analysis processing and intelligent recognition model training are performed: an image database is constructed, each to-be-trained image is processed in two ways, where in one aspect, the image is stored as an original image, and in the other aspect, the image is labeled with a corresponding true tag, and pictures having the same type of tag are put into a picture set of the same type simultaneously; an image recognition neural network is constructed, a to-be-trained original image is input into the neural network for image recognition processing to obtain an output tag type; the output tag type is compared with a true tag of the picture, and loss calculation is performed on a result; a parameter of the neural network is adjusted through the loss calculation, and a neural network model is updated; image recognition is re-performed on the picture to finally obtain a perfect image recognition neural network; and finally an erosion defect is recognized through the image recognition neural network, and corresponding evaluation and early warning are performed on the basis of an evaluation standard and the early warning threshold constructed in step 2.

Specifically, in step 4, when the image is recognized, recognition information includes a type, position, shape, and depth of erosion. As the database grows continuously and a computer performs deep learning of image recognition repeatedly, an image recognition capacity of the computer may be gradually improved, and the recognition efficiency and accuracy may be improved.

Moreover, the neural network model may be upgraded. Patrol inspection is performed once before and after flood discharge, and an evaluation result after flood discharge is compared with an evaluation result before flood discharge. Through repeated patrol inspection and flood discharge in such a reciprocating manner, pictures of various damage types are added into an original database. Therefore, deep learning of image recognition of the computer in a patrol inspection and flood discharge process is strengthened, a calculated neural network framework is perfected and updated, and the precision of a subsequent prediction result is improved, so as to continue to update data grade evaluation. The patrol inspection is required to be performed by two or more persons simultaneously. One person is responsible for inspection, and the other person is responsible for recording. The number of reciprocating patrol inspection is not less than five.

In the present disclosure, a large picture database is required for training. The database is mainly sourced from accumulated pictures of a project in a long time. Algorithm models and corresponding functions involved in the neural network in training are not unique, and different algorithm models and functions may be replaced. The image recognition accuracy of different algorithm models varies. However, the image recognition accuracy may be improved through repeated deep learning and continuous expansion of an existing database.

Figure 9:
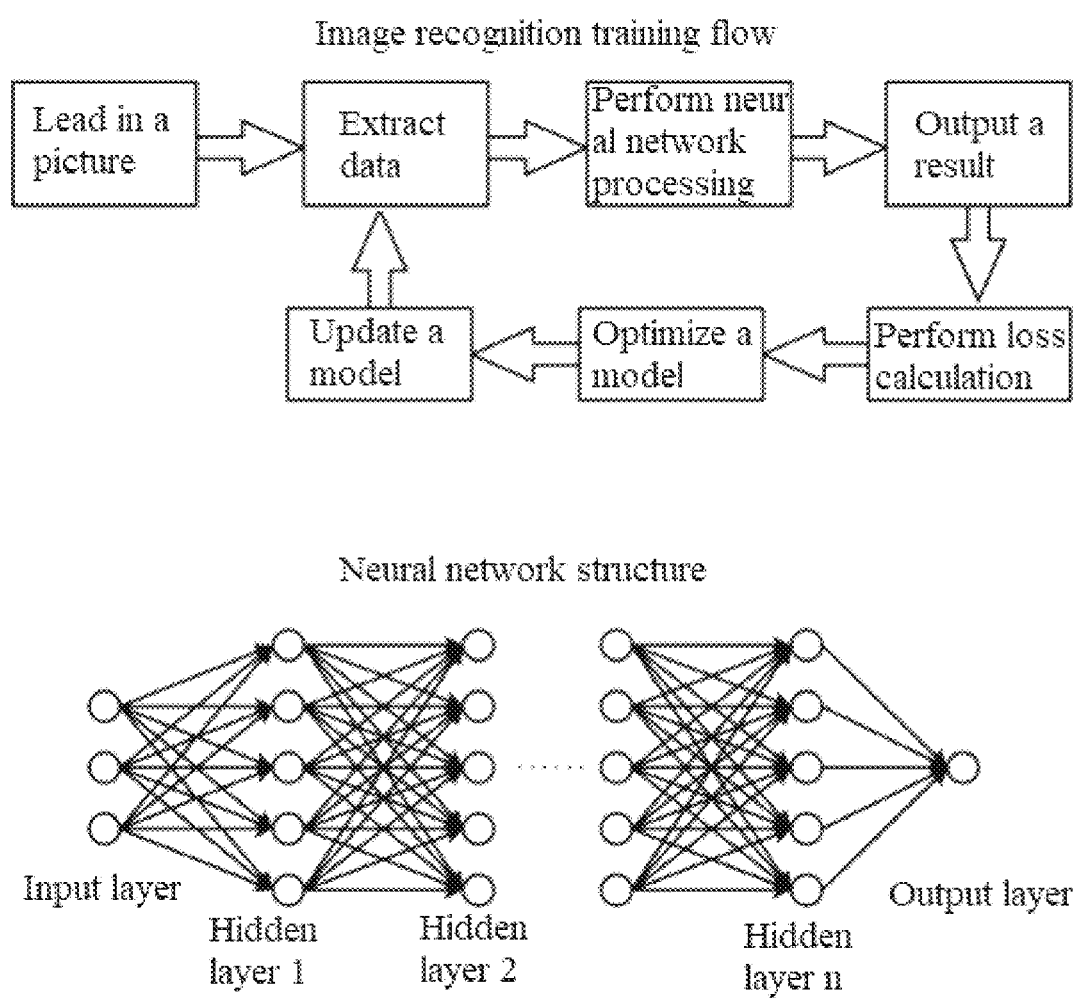
FIG. 9 shows an image recognition training flow and its internal neural network structure according to the present disclosure.

As shown in FIG. 9, the computer first converts a transmitted image into data and loads the data into a constructed neural network for image recognition. There are a variety of neural network models, but a convolutional neural network is most commonly used in image recognition. The present disclosure is designed to employ the convolutional neural network. A neural network structure includes an input layer, a hidden layer, and an output layer. The input layer takes the data converted from the image as an input, the hidden layer converts the input into something available by the output layer, and the output layer acquires a probability that the image is of a specific type. The hidden layer of the convolutional neural network further includes a convolutional layer, an activation layer, a pooling layer, and a fully connected layer. The convolutional layer functions as a filter to search for each part and pixel in the image, extract a key feature of the image, and find out a recognition mode. A generation process of a convolutional layer Hi may be described as $H_i=\sigma(H_{i-1} \otimes W_i+b_i)$. $W_i$ denotes a weight vector of a convolutional kernel of an ith layer. An operation symbol $\otimes$ denotes that the convolutional kernel and an image or a feature map of an (i−1)th layer undergo a convolution operation. bi denotes a selected offset vector. Since the convolution operation is linear, in order to increase the complexity of the model, an activation function is typically added to the activation layer. Therefore, the non-linearity of the model is increased, thereby simulating any function and enhancing an expression capacity of the network. The activation function commonly used in the convolutional neural network is an ReLU function ReLU:$f(x)=\max(x,0)$. Since a feature map generated through convolution has massive redundant information, the pooling layer is required to be narrowed, so as to reduce the dimension of the feature map. A pooling layer process includes maximum pooling and average pooling. A pooling process is to evenly divide an input image into several rectangular regions. The maximum pooling is to solve a maximum value of pixel points in a pooling region. The average pooling is to solve an average of images in the pooling region. The fully-connected layer is to integrate features in the image feature map that has passed through a plurality of convolutional layers and pooling layers. Accordingly, a high-layer meaning of the image feature is obtained for image classification. An output result then undergoes loss calculation. A value calculated through a loss function is configured to denote a quantitative expression of a difference between a probability model in the neural network and an ideal probability model. A mean square error function $MSE=1/m\Sigma_{i=1}^{m}(y_i-\overline{y}_i)^2$ is employed. $y_i$ denotes an output of the neural network. $\overline{y}_i$ denotes true supervision data. i denotes the dimension of the data. In order to optimize the loss function and reduce the difference between the neural network model and an ideal model, it is required to adjust the parameter of the neural network through back propagation. According to the back propagation, offset generated after to-be-trained data are trained through the neural network undergoes back delivery and is allocated to each parameter for adjustment. In this way, the model is optimized and a loss is reduced. Through such deep learning, on the basis of massive image data, the computer constantly optimizes the neural network, thereby improving the prediction accuracy, and realizing a precise image recognition function.

An operation principle of the present disclosure is as follows: upon take-off, the unmanned aerial vehicle flies along a specified path through locating of a global positioning system (GPS). The lifting electric motor 25 on the supporting frame 24 is activated. The lifting electric motor 25 drives the driving blade 26 to rotate, thereby generating the lift force to drive the patrol inspection device body 1 to fly. After the patrol inspection device flies into the flood discharge tunnel, the first irradiation lamp 21 may be turned on for light irradiation.

During lateral scanning, the first driving electric motor 10 inside the transmission platform 9 is activated. The first driving electric motor 10 drives the driving rod 11 to perform clockwise driving as well as counterclockwise driving within 3 s to implement reciprocating driving. The driving rod 11 drives the holographic three-dimensional scanner 12 to perform left-right reciprocating driving, and the second driving electric motor 13 is activated simultaneously to drive the rotary rod 14 to rotate counterclockwise. The rotary rod 14 drives the connection shaft block 15 to rotate, and the connection shaft block 15 drives the measurement camera 16 to rotate. In this way, the measurement camera 16 starts to perform left-right reciprocation and up-down angular reciprocating driving, so as to perform lateral irradiation.

Upon light switch along with the irradiation, during rotation of the rotary rod 14, the rotary rod 14 drives the driving sleeve ring rod 17 to rotate, the driving sleeve ring rod 17 drives the adjustment rotary rod 18 to deflect downwards, and the adjustment rotary rod 18 drives the adjustment shaft ring block 20 to deflect angularly downwards. When the first irradiation lamp 21 is damaged, the switching electric motor 19 may be activated to rotate, the switching electric motor 19 drives the adjustment rotary rod 18 to rotate, and the adjustment rotary rod 18 drives the adjustment shaft ring block 20 to rotate by 180 degrees clockwise. Accordingly, switch from the first irradiation lamp 21 to the second irradiation lamp 22 is performed, which may avoid disturbing the normal use after the first irradiation lamp 21 is damaged.

A top end surface scanning operation is as follows: after lateral scanning of the flood discharge tunnel along the specified path has been completed, the servo driving electric motor 5 may be activated to drive the transmission shaft rod 4 to perform driving clockwise. The transmission shaft rod 4 drives the two connection shaft ring rods 6 to perform driving on the connection supporting shaft blocks 3, and the connection shaft ring rods 6 drive the fixing rods 7 to enable the connection sleeve ring block 8 to drive clockwise. In this way, the connection sleeve ring block 8 drives the transmission platform 9 to turn upwards. The transmission platform 9 drives the holographic three-dimensional scanner 12 to turn the measurement camera 16 upwards by 90 degrees clockwise, and the measurement camera 16 starts to face a top surface of the flood discharge tunnel. In this way, the first driving electric motor 10 may be activated to drive the driving rod 11 to perform reciprocating driving, so as to scan the top surface of the tunnel without a blind corner.

Stability leveling is as follows: when the measurement camera 16 is turned upwards by 90 degrees clockwise, the supporting frame 24 deflects angularly, and the level sensor 46 may detect levelness simultaneously. Moreover, the electric cylinder 36 may be activated to drive the pushing supporting rod 35 to move leftwards, the pushing supporting rod 35 drives the crossed guide block 34 to move leftwards, and the crossed guide block 34 moves leftwards along the guide groove 33. Further, the crossed guide block 34 moves leftwards along the leveling guide plate 32, and the crossed guide block 34 drives the two second batteries 37 to move leftwards. The second batteries 37 drive the supporting plate 38 to move leftwards, and the supporting plate 38 drives the connection port 39 to move leftwards. In this way, a weight of the supporting plate 38 may be moved leftwards through the first driving electric motor 10, so as to keep balance with a weight of a turned measurement camera 16. Therefore, the stability of the patrol inspection device body 1 in a turning process may be ensured.

Upon back transmission of the data for alarming, when an image and scanning data transmitted back are transmitted to the wireless receiver 40 through the wireless transmitter 27, the wireless receiver 40 receives the image and transmits same into the image memory 43. The image processor 44 performs image comparison processing and selects different grades. The acousto-optic alarm 42 may play a role in alarming.

The measurement camera 16 is configured to face the top surface and an interior of the flood discharge tunnel for measurement.

The holographic three-dimensional scanner 12 is configured to scan the top surface of the tunnel without the blind corner and measure a size in a scanning process along with the measurement camera 16. Accordingly, three-dimensional panoramic scanning and data measurement are synchronously performed.

The foregoing shows and describes the basic principles, main features, and advantages of the present disclosure. Those skilled in the art should understand that the present disclosure is not limited to the above examples, and the above examples and the descriptions in the description are merely illustrative of the principles of the present disclosure. Various changes and improvements can also be made to the present disclosure without departing from the spirit and scope of the present disclosure, and these changes and improvements fall within the claimed scope of protection of the present disclosure. The claimed scope of protection of the present disclosure is defined by the appended claims only.

What is claimed is:

1. An automatic patrol inspection and intelligent erosion defect detection apparatus for a flood discharge tunnel, comprising a patrol inspection device body (1), a top end of the patrol inspection device body (1) being provided with a protective housing (2), and an adjustment mechanism being arranged inside the protective housing (2); wherein the adjustment mechanism comprises a connection supporting shaft block (3) arranged inside the protective housing (2), one side of the connection supporting shaft block (3) being connected to a transmission shaft rod (4), the other end of the transmission shaft rod (4) being provided with a servo driving electric motor (5) for driving, two symmetrically-arranged connection shaft ring rods (6) sleeving an outside of the transmission shaft rod (4), a portion, close to the other end, of the connection shaft ring rod (6) being internally provided with a fixing rod (7) in a penetrated manner, one side of the middle of the fixing rod (7) being connected to a connection sleeve ring block (8), one side of the connection sleeve ring block (8) being connected to a transmission platform (9), a first driving electric motor (10) being mounted on the transmission platform (9), an output end of the first driving electric motor (10) being connected to a driving rod (11), a top end of the driving rod (11) being provided with a holographic three-dimensional scanner (12), and a second driving electric motor (13) being arranged inside the holographic three-dimensional scanner (12).

2. The automatic patrol inspection and intelligent erosion defect detection apparatus for a flood discharge tunnel according to claim 1, wherein an output end of the second driving electric motor (13) is connected to a rotary rod (14), a connection shaft block (15) sleeving an outside of the rotary rod (14), and one side of the connection shaft block (15) being fixedly connected to a measurement camera (16).

3. The automatic patrol inspection and intelligent erosion defect detection apparatus for a flood discharge tunnel according to claim 2, wherein linkage switching mechanisms sleeve outsides of one ends of the rotary rods (14), the linkage switching mechanism comprising a driving sleeve ring rod (17) arranged outside one end of the rotary rod (14), an adjustment rotary rod (18) being movably connected into a portion, close to a top end, of the driving sleeve ring rod (17), a switching electric motor (19) being mounted at one end of the adjustment rotary rod (18), an output end of the switching electric motor (19) being fixedly connected to the adjustment rotary rod (18), an adjustment shaft ring block (20) being arranged outside the adjustment rotary rod (18) and positioned on one side of the top end of the driving sleeve ring rod (17), a first irradiation lamp (21) being mounted on one side of the adjustment shaft ring block (20), and a second irradiation lamp (22) being mounted on the other side of the adjustment shaft ring block (20).

4. The automatic patrol inspection and intelligent erosion defect detection apparatus for a flood discharge tunnel according to claim 3, wherein a limiting screw block (23) is mounted on one side of the driving sleeve ring rod (17).

5. The automatic patrol inspection and intelligent erosion defect detection apparatus for a flood discharge tunnel according to claim 1, wherein four supporting frames (24) are symmetrically arranged outside the patrol inspection device body (1), a portion, close to an end portion, of the supporting frame (24) being provided with a lifting electric motor (25), an output end of the lifting electric motor (25) being connected to a driving blade (26), and a level sensor (46) being mounted on one side of the driving blade (26); and a wireless transmitter (27) is arranged inside the patrol inspection device body (1), and a cambered support (29) is arranged below the two adjacent supporting frames (24), a buffer base (30) being arranged below the cambered support (29), and a bottom end of the buffer base (30) being connected to a bulged support (31).

6. The automatic patrol inspection and intelligent erosion defect detection apparatus for a flood discharge tunnel according to claim 5, wherein an output end of the wireless transmitter (27) is connected to a wireless receiver (40), a processing device (41) being mounted at a bottom end of the wireless receiver (40), an acousto-optic alarm (42) being mounted on one side of the wireless receiver (40), a display screen (45) being embedded in one side of the processing device (41), an image memory (43) being arranged below the display screen (45), and an image processor (44) being arranged on one side of the image memory (43).

7. The automatic patrol inspection and intelligent erosion defect detection apparatus for a flood discharge tunnel according to claim 1, wherein a first battery (28) is arranged below the patrol inspection device body (1), two leveling guide plates (32) being symmetrically arranged below the first battery (28), one opposite sides of the two leveling guide plates (32) being provided with guide grooves (33), a crossed guide block (34) being slidably arranged inside the guide groove (33), one end of the crossed guide block (34) being connected to a pushing supporting rod (35), an electric cylinder (36) being mounted at one end of the pushing supporting rod (35), a second battery (37) being arranged between the two crossed guide blocks (34), a bottom end of the second battery (37) being connected to a supporting plate (38), and one end of the second battery (37) being provided with a connection port (39).

8. An automatic patrol inspection and intelligent erosion defect detection method for a flood discharge tunnel, employing the automatic patrol inspection and intelligent erosion defect detection apparatus for a flood discharge tunnel according to claim 1 and comprising:
- step 1, constructing a flood discharge tunnel erosion defect database by acquiring global flood discharge tunnel operation condition data comprising a type, position, scale, and impact of erosion generated during operation of massive global flood discharge tunnels; and then dividing flood discharge tunnel erosion defect data in the flood discharge tunnel erosion defect database into three grades, wherein a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;
- step 2, constructing a flood discharge tunnel erosion defect analysis and evaluation standard and early warning threshold: constructing a defect type evaluation standard according to impact degrees, on the safety of flood discharge, of scouring, abrasion, and cavitation types: classifying no erosion on a surface of the tunnel as grade 1, an erosion depth less than 3 mm as grade 2, and an erosion depth greater than or equal to 3 mm as grade 3;
- step 3, performing automatic patrol inspection through the automatic patrol inspection and intelligent erosion defect detection apparatus for a flood discharge tunnel: performing patrol inspection on an entire tunnel through laser scanning along a patrol inspection route set before take-off, performing a lighting operation, and uploading an acquired image wirelessly; and
- step 4, performing image analysis processing and intelligent recognition model training: constructing an image database, processing each to-be-train image in two ways, wherein in one aspect, the image is stored as an original image, and in the other aspect, the image is labeled with a corresponding true tag, and putting pictures having the same type of tag into a picture set of the same type simultaneously; constructing an image recognition neural network, inputting a to-be-trained original image into the neural network for image recognition processing to obtain an output tag type; comparing the output tag type with a true tag of the picture, and performing loss calculation on a result; adjusting a parameter of the neural network through the loss calculation, and updating a neural network model; re-performing image recognition on the picture to finally obtain a perfect image recognition neural network; and finally recognizing an erosion defect through the image recognition neural network, and performing corresponding evaluation and early warning on the basis of the evaluation standard and early warning threshold constructed in step 2.

9. An automatic patrol inspection and intelligent erosion defect detection method for a flood discharge tunnel, employing the automatic patrol inspection and intelligent erosion defect detection apparatus for a flood discharge tunnel according to claim 2 and comprising:
- step 1, constructing a flood discharge tunnel erosion defect database by acquiring global flood discharge tunnel operation condition data comprising a type, position, scale, and impact of erosion generated during operation of massive global flood discharge tunnels; and then dividing flood discharge tunnel erosion defect data in the flood discharge tunnel erosion defect database into three grades, wherein a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;
- step 2, constructing a flood discharge tunnel erosion defect analysis and evaluation standard and early warning threshold: constructing a defect type evaluation standard according to impact degrees, on the safety of flood discharge, of scouring, abrasion, and cavitation types: classifying no erosion on a surface of the tunnel as grade 1, an erosion depth less than 3 mm as grade 2, and an erosion depth greater than or equal to 3 mm as grade 3;
- step 3, performing automatic patrol inspection through the automatic patrol inspection and intelligent erosion defect detection apparatus for a flood discharge tunnel: performing patrol inspection on an entire tunnel through laser scanning along a patrol inspection route set before take-off, performing a lighting operation, and uploading an acquired image wirelessly; and
- step 4, performing image analysis processing and intelligent recognition model training: constructing an image database, processing each to-be-train image in two ways, wherein in one aspect, the image is stored as an original image, and in the other aspect, the image is labeled with a corresponding true tag, and putting pictures having the same type of tag into a picture set of the same type simultaneously; constructing an image recognition neural network, inputting a to-be-trained original image into the neural network for image recognition processing to obtain an output tag type; comparing the output tag type with a true tag of the picture, and performing loss calculation on a result; adjusting a parameter of the neural network through the loss calculation, and updating a neural network model; re-performing image recognition on the picture to finally obtain a perfect image recognition neural network; and finally recognizing an erosion defect through the image recognition neural network, and performing corresponding evaluation and early warning on the basis of the evaluation standard and early warning threshold constructed in step 2.

10. An automatic patrol inspection and intelligent erosion defect detection method for a flood discharge tunnel, employing the automatic patrol inspection and intelligent erosion defect detection apparatus for a flood discharge tunnel according to claim 3 and comprising:
- step 1, constructing a flood discharge tunnel erosion defect database by acquiring global flood discharge tunnel operation condition data comprising a type, position, scale, and impact of erosion generated during operation of massive global flood discharge tunnels; and then dividing flood discharge tunnel erosion defect data in the flood discharge tunnel erosion defect database into three grades, wherein a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;
- step 2, constructing a flood discharge tunnel erosion defect analysis and evaluation standard and early warning threshold: constructing a defect type evaluation standard according to impact degrees, on the safety of flood discharge, of scouring, abrasion, and cavitation types: classifying no erosion on a surface of the tunnel as grade 1, an erosion depth less than 3 mm as grade 2, and an erosion depth greater than or equal to 3 mm as grade 3;

step 3, performing automatic patrol inspection through the automatic patrol inspection and intelligent erosion defect detection apparatus for a flood discharge tunnel: performing patrol inspection on an entire tunnel through laser scanning along a patrol inspection route set before take-off, performing a lighting operation, and uploading an acquired image wirelessly; and step 4, performing image analysis processing and intelligent recognition model training: constructing an image database, processing each to-be-train image in two ways, wherein in one aspect, the image is stored as an original image, and in the other aspect, the image is labeled with a corresponding true tag, and putting pictures having the same type of tag into a picture set of the same type simultaneously; constructing an image recognition neural network, inputting a to-be-trained original image into the neural network for image recognition processing to obtain an output tag type; comparing the output tag type with a true tag of the picture, and performing loss calculation on a result; adjusting a parameter of the neural network through the loss calculation, and updating a neural network model; re-performing image recognition on the picture to finally obtain a perfect image recognition neural network; and finally recognizing an erosion defect through the image recognition neural network, and performing corresponding evaluation and early warning on the basis of the evaluation standard and early warning threshold constructed in step 2.

11. An automatic patrol inspection and intelligent erosion defect detection method for a flood discharge tunnel, employing the automatic patrol inspection and intelligent erosion defect detection apparatus for a flood discharge tunnel according to claim 4 and comprising:

step 1, constructing a flood discharge tunnel erosion defect database by acquiring global flood discharge tunnel operation condition data comprising a type, position, scale, and impact of erosion generated during operation of massive global flood discharge tunnels; and then dividing flood discharge tunnel erosion defect data in the flood discharge tunnel erosion defect database into three grades, wherein a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;

step 2, constructing a flood discharge tunnel erosion defect analysis and evaluation standard and early warning threshold: constructing a defect type evaluation standard according to impact degrees, on the safety of flood discharge, of scouring, abrasion, and cavitation types: classifying no erosion on a surface of the tunnel as grade 1, an erosion depth less than 3 mm as grade 2, and an erosion depth greater than or equal to 3 mm as grade 3;

step 3, performing automatic patrol inspection through the automatic patrol inspection and intelligent erosion defect detection apparatus for a flood discharge tunnel: performing patrol inspection on an entire tunnel through laser scanning along a patrol inspection route set before take-off, performing a lighting operation, and uploading an acquired image wirelessly; and step 4, performing image analysis processing and intelligent recognition model training: constructing an image database, processing each to-be-train image in two ways, wherein in one aspect, the image is stored as an original image, and in the other aspect, the image is labeled with a corresponding true tag, and putting pictures having the same type of tag into a picture set of the same type simultaneously; constructing an image recognition neural network, inputting a to-be-trained original image into the neural network for image recognition processing to obtain an output tag type; comparing the output tag type with a true tag of the picture, and performing loss calculation on a result; adjusting a parameter of the neural network through the loss calculation, and updating a neural network model; re-performing image recognition on the picture to finally obtain a perfect image recognition neural network; and finally recognizing an erosion defect through the image recognition neural network, and performing corresponding evaluation and early warning on the basis of the evaluation standard and early warning threshold constructed in step 2.

12. An automatic patrol inspection and intelligent erosion defect detection method for a flood discharge tunnel, employing the automatic patrol inspection and intelligent erosion defect detection apparatus for a flood discharge tunnel according to claim 5 and comprising:

step 1, constructing a flood discharge tunnel erosion defect database by acquiring global flood discharge tunnel operation condition data comprising a type, position, scale, and impact of erosion generated during operation of massive global flood discharge tunnels; and then dividing flood discharge tunnel erosion defect data in the flood discharge tunnel erosion defect database into three grades, wherein a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;

step 2, constructing a flood discharge tunnel erosion defect analysis and evaluation standard and early warning threshold: constructing a defect type evaluation standard according to impact degrees, on the safety of flood discharge, of scouring, abrasion, and cavitation types: classifying no erosion on a surface of the tunnel as grade 1, an erosion depth less than 3 mm as grade 2, and an erosion depth greater than or equal to 3 mm as grade 3;

step 3, performing automatic patrol inspection through the automatic patrol inspection and intelligent erosion defect detection apparatus for a flood discharge tunnel: performing patrol inspection on an entire tunnel through laser scanning along a patrol inspection route set before take-off, performing a lighting operation, and uploading an acquired image wirelessly; and step 4, performing image analysis processing and intelligent recognition model training: constructing an image database, processing each to-be-train image in two ways, wherein in one aspect, the image is stored as an original image, and in the other aspect, the image is labeled with a corresponding true tag, and putting pictures having the same type of tag into a picture set of the same type simultaneously; constructing an image recognition neural network, inputting a to-be-trained original image into the neural network for image recognition processing to obtain an output tag type; comparing the output tag type with a true tag of the picture, and performing loss calculation on a result; adjusting a parameter of the neural network through the loss calculation, and updating a neural network model; re-performing image recognition on the picture to finally obtain a perfect image recognition neural network; and finally recognizing an erosion defect through the image recognition neural network, and performing corresponding evaluation and early warning on the basis of the evaluation standard and early warning threshold constructed in step 2.

13. An automatic patrol inspection and intelligent erosion defect detection method for a flood discharge tunnel, employing the automatic patrol inspection and intelligent erosion defect detection apparatus for a flood discharge tunnel according to claim 6 and comprising:

step 1, constructing a flood discharge tunnel erosion defect database by acquiring global flood discharge tunnel operation condition data comprising a type, position, scale, and impact of erosion generated during operation of massive global flood discharge tunnels; and then dividing flood discharge tunnel erosion defect data in the flood discharge tunnel erosion defect database into three grades, wherein a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;

step 2, constructing a flood discharge tunnel erosion defect analysis and evaluation standard and early warning threshold: constructing a defect type evaluation standard according to impact degrees, on the safety of flood discharge, of scouring, abrasion, and cavitation types: classifying no erosion on a surface of the tunnel as grade 1, an erosion depth less than 3 mm as grade 2, and an erosion depth greater than or equal to 3 mm as grade 3;

step 3, performing automatic patrol inspection through the automatic patrol inspection and intelligent erosion defect detection apparatus for a flood discharge tunnel: performing patrol inspection on an entire tunnel through laser scanning along a patrol inspection route set before take-off, performing a lighting operation, and uploading an acquired image wirelessly; and step 4, performing image analysis processing and intelligent recognition model training: constructing an image database, processing each to-be-train image in two ways, wherein in one aspect, the image is stored as an original image, and in the other aspect, the image is labeled with a corresponding true tag, and putting pictures having the same type of tag into a picture set of the same type simultaneously; constructing an image recognition neural network, inputting a to-be-trained original image into the neural network for image recognition processing to obtain an output tag type; comparing the output tag type with a true tag of the picture, and performing loss calculation on a result; adjusting a parameter of the neural network through the loss calculation, and updating a neural network model; re-performing image recognition on the picture to finally obtain a perfect image recognition neural network; and finally recognizing an erosion defect through the image recognition neural network, and performing corresponding evaluation and early warning on the basis of the evaluation standard and early warning threshold constructed in step 2.

14. An automatic patrol inspection and intelligent erosion defect detection method for a flood discharge tunnel, employing the automatic patrol inspection and intelligent erosion defect detection apparatus for a flood discharge tunnel according to any one of claim 7 and comprising:

step 1, constructing a flood discharge tunnel erosion defect database by acquiring global flood discharge tunnel operation condition data comprising a type, position, scale, and impact of erosion generated during operation of massive global flood discharge tunnels; and then dividing flood discharge tunnel erosion defect data in the flood discharge tunnel erosion defect database into three grades, wherein a defect in grade 1 has no impact on safety of flood discharge; a defect in grade 2 has a smaller impact and is to be focused and further observed; and a defect in grade 3 has a greater impact, is to be fixed with repair measures, and indicates an early warning prompt;

step 2, constructing a flood discharge tunnel erosion defect analysis and evaluation standard and early warning threshold: constructing a defect type evaluation standard according to impact degrees, on the safety of flood discharge, of scouring, abrasion, and cavitation types: classifying no erosion on a surface of the tunnel as grade 1, an erosion depth less than 3 mm as grade 2, and an erosion depth greater than or equal to 3 mm as grade 3;

step 3, performing automatic patrol inspection through the automatic patrol inspection and intelligent erosion defect detection apparatus for a flood discharge tunnel: performing patrol inspection on an entire tunnel through laser scanning along a patrol inspection route set before take-off, performing a lighting operation, and uploading an acquired image wirelessly; and step 4, performing image analysis processing and intelligent recognition model training: constructing an image database, processing each to-be-train image in two ways, wherein in one aspect, the image is stored as an original image, and in the other aspect, the image is labeled with a corresponding true tag, and putting pictures having the same type of tag into a picture set of the same type simultaneously; constructing an image recognition neural network, inputting a to-be-trained original image into the neural network for image recognition processing to obtain an output tag type; comparing the output tag type with a true tag of the picture, and performing loss calculation on a result; adjusting a parameter of the neural network through the loss calculation, and updating a neural network model; re-performing image recognition on the picture to finally obtain a perfect image recognition neural network; and finally recognizing an erosion defect through the image recognition neural network, and performing corresponding evaluation and early warning on the basis of the evaluation standard and early warning threshold constructed in step 2.

15. The automatic patrol inspection and intelligent erosion defect detection method for a flood discharge tunnel according to claim 8, wherein in step 4, when the image is recognized, recognition information comprises a type, position, shape, and depth of erosion.

* * * * *